Figure 1:
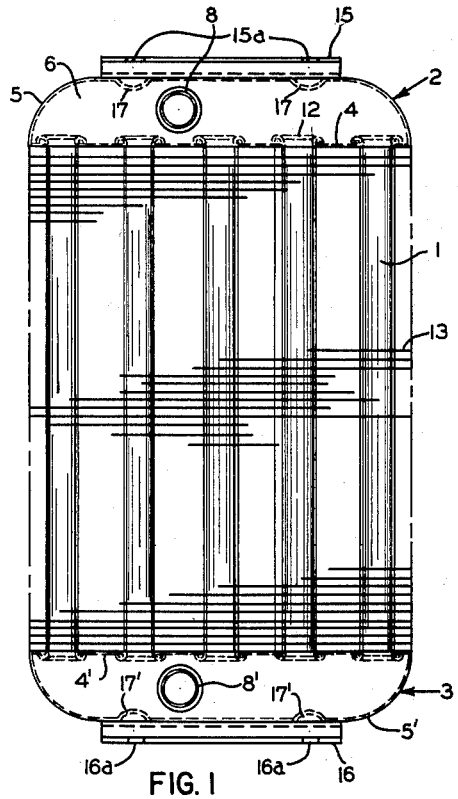

March 27, 1962 J. P. ALBERS ETAL 3,027,142

HEAT EXCHANGER

Filed May 28, 1956 2 Sheets-Sheet 1

INVENTORS
JOHN P. ALBERS
&
BY   HUBERT G. HUBER

Arthur H. Robert

ATTORNEY

March 27, 1962 J. P. ALBERS ETAL 3,027,142
HEAT EXCHANGER
Filed May 28, 1956 2 Sheets-Sheet 2
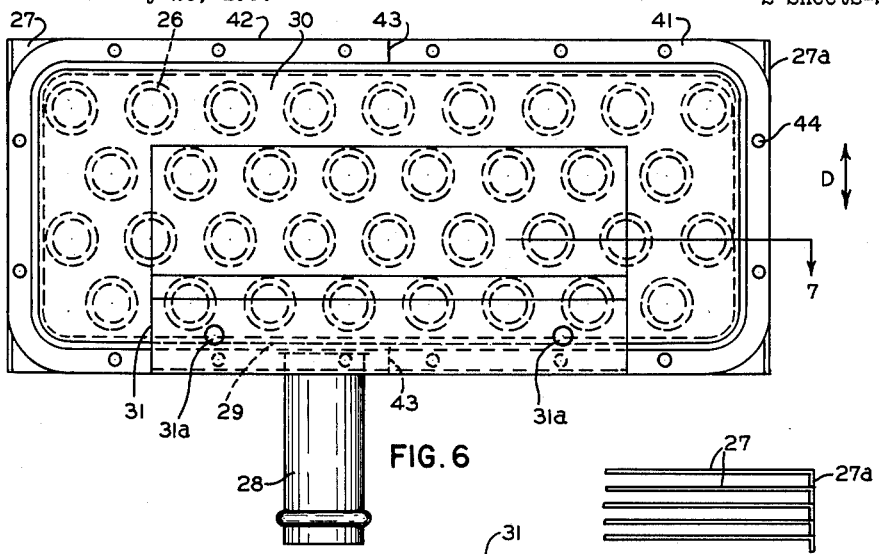
FIG. 6
FIG. 9
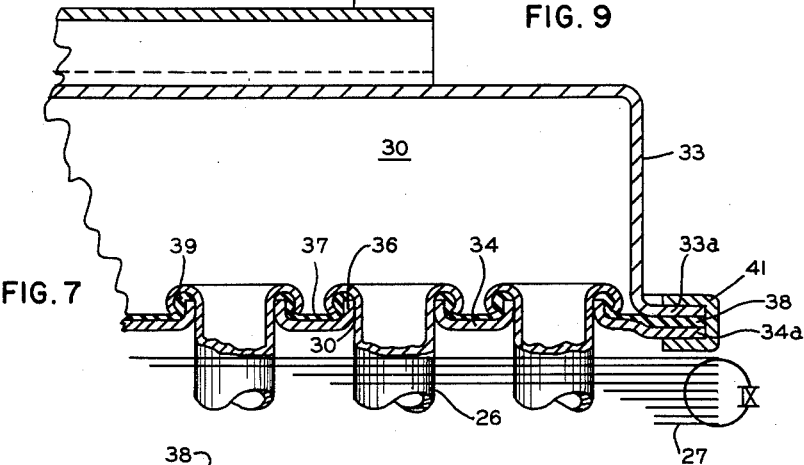
FIG. 7
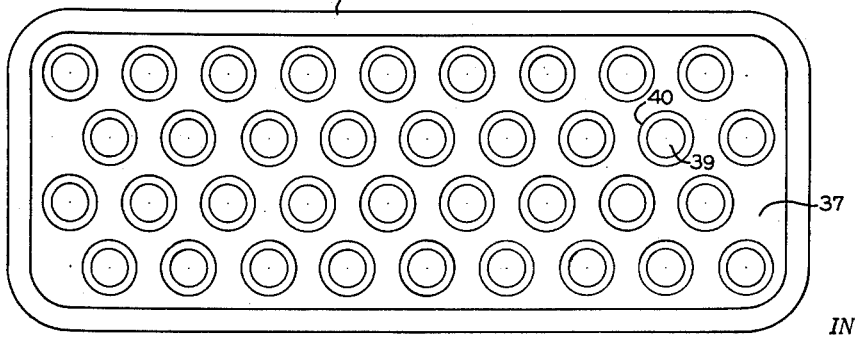
FIG. 8
INVENTORS.
JOHN P. ALBERS
&
HUBERT G. HUBER
BY
ATTORNEY United States Patent Office 3,027,142
Patented Mar. 27, 1962

3,027,142
HEAT EXCHANGER
John P. Albers and Hubert G. Huber, Louisville, Ky., assignors to Reynolds Metals Company, Louisville, Ky., a corporation of Delaware
Filed May 28, 1956, Ser. No. 587,682
5 Claims. (Cl. 257—154)

This invention relates to heat exchangers of the tube sheet type.

In manufacturing heat exchangers of the tube sheet type, wherein a bank of tubes projects through a tube sheet, it is customary to braze, solder or weld the projecting ends of the tubes to the tube sheet. Each of these procedures requires a very considerable amount of time and labor and is correspondingly expensive.

The principal objects of the present invention are: to avoid the use of a fused metal and like joints and their attendant manufacturing difficulties and expense; to provide a novel means for joining the tubes to the tube sheet on a mass production basis producing an effective joinder in a rapid and relatively inexpensive manner; and to provide an arrangement which requires but one smack of a die to join all tube ends to the tube sheet both firmly and effectively.

Another important object is to provide a novel and simple way of assembling a header upon a tube sheet. Another important object is to provide an improved structure which is leak-proof, neat, relatively corrosion-free and which permits the rapid assembly of the parts into a complete structure in producing a leak-proof, neat and relatively corrosion-free heat exchanger.

The principal objects of our invention may be achieved simply by flanging each opening of the tube sheet in the direction of the projecting ends of the tubes, assembling the tubes to project through the openings, threading the end of each tube with an O-ring to abut the free end of the tube sheet flange, expanding or rolling the end of each tube outwardly and rolling or bending it reentrantly back over the O-ring to compress the O-ring into a tight sealing engagement with the tube sheet flange. Using O-rings composed of the relatively indestructable plastic material available today, this method makes possible the cheap and rapid production of a firm fluid-tight joint which will outlive, in all probability, the rest of the radiator or heat exchanger. Furthermore, by using a unitary gasket containing an O-ring for each tube, all of the O-rings can be positioned at one and the same time. Through the use of a single die, all tubes can be expanded and reentrantly bent with one smack of the die. Through these procedures, therefore, it becomes possible to produce these joints on a mass production basis at a relatively low cost.

In accordance with another feature of our invention, a header may be easily and quickly assembled upon the tube sheet in a condition ready for securement thereto. This initially involves inverting a hollow header-forming member over the tube sheet with its peripheral flange cooperating with the peripheral portions of the unitary O-ring gasket and with the corresponding peripheral portions of the tube sheet to form a peripheral flange composed of three plies. Now in accordance with our invention, a pair of members, which are of U-shape both in the direction of their length and in cross-section can be slid transversely over diametrically opposite halves of this peripheral flange and each member then indented or "dimpled" on opposite sides at spaced intervals to grip the flange at corresponding intervals and form an extremely tight and effective seal.

Figure 2:
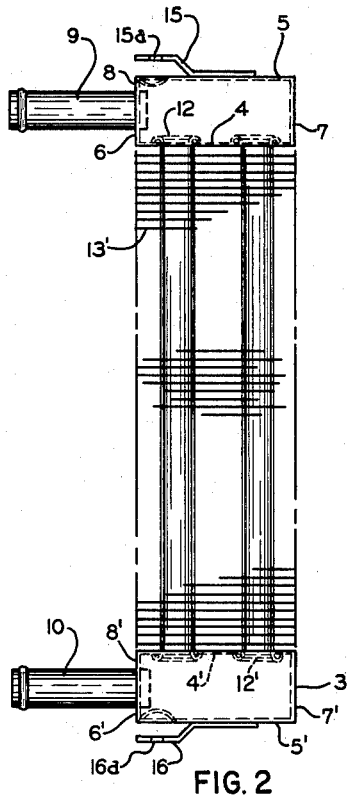
Figure 4:
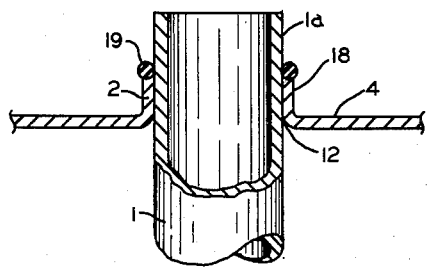
Figure 5:
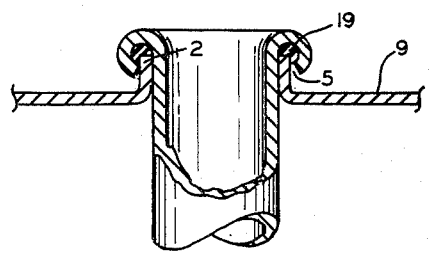
Figure 3:
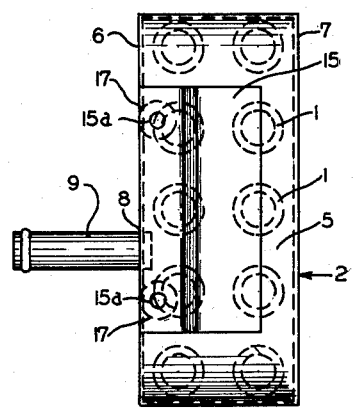

The invention is illustrated in the accompanying drawing wherein:

FIG. 1 is a front view of a heat exchanger illustrating the novel construction of the invention;

FIG. 2 is a side view of the heat exchanger of FIG. 1;
FIG. 3 is a plan view of the heat exchanger of FIG. 1;
FIG. 4 is a fragmentary enlarged view partially in section, of a tube end and tube sheet opening prior to the sealing operation;
FIG. 5 is a view of FIG. 4 subsequent to the sealing operation;
FIG. 6 is a plan view of a modification of the heat exchanger of FIG. 1;
FIG. 7 is a view taken substantially along line 7—7 of FIG. 6;
FIG. 8 is a plan view of the unitary gasket member incorporated in the modification of FIG. 6 and
FIG. 9 is an enlarged view of the portion of FIG. 7 within the circle IX.

In carrying out the invention, there is shown in FIG. 1 a heat exchanger of the type commonly employed in the cooling system of automobiles driven by internal combustion engines. The heat exchanger consists of a plurality of tubes 1 of substantially the same length arranged in spaced parallel relationship. While the heat exchanger is shown provided with a total of ten tubes, any number of tubes may be chosen according to the desired cooling capacity and design of the heat exchanger. Arranged at opposite ends of the group of tubes 1 are a pair of hollow fluid collectors or manifolds 2, 3 each of which define an internal space communicating with all of the tube ends at the end of the heat exchanger with which the manifold is associated.

Referring now to FIG. 2, the upper manifold 2 consists of a bottom wall or tube sheet 4, an arcuate upper wall 5, and a pair of side walls 6, 7, all of which are preferably welded or otherwise assembled together to form a unitary structure. In a similar manner, the lower manifold 3 contains a bottom tube sheet 4', an arcuate top wall 5' and a pair of side walls 6', 7'.

In order to provide for connecting the heat exchanger of FIG. 1 into the cooling system with which it is associated, manifold 2 is provided with a lateral opening 8, preferably located in the side wall 6 which receives a tubing connector 9. Similarly, manifold 3, arranged below the heat exchanger at the bottom of the tubes 1, contains a lateral opening 8' which accommodates a tubing connector 10.

The tube sheet 4 of manifold 2 is provided with spaced tubulated openings 12, the number of which corresponds to the number of tubes 1 employed. These openings 12 are arranged to insertedly receive the upper ends of the tubes 1, and a fluid-tight connection is made between the tubes 1 and tube sheet 4 to prevent any leakage of fluid from the space defined by the manifolds in a manner to be explained hereinafter. The tube sheet 4' of manifold 3 likewise contains spaced tubulated openings 12' which accommodate the lower ends of tubes 1 to which a similar fluid-tight connection is made.

In order to improve the heat transfer characteristics of the heat exchanger, a plurality of plates or fins 13 are stacked in spaced parallel relationship and contain appropriate openings (not shown) through which the tubes 1 pass. As is well known in this type of heat exchanger, these fins 13 increase the heat transfer surfaces of the tubes 1 and may be secured thereto in any convenient manner such as by expanding the tubes into locking engagement with the fin openings by forcing a ball mandrel or the like through the tubes 1 when the fins 13 are located in the arrangement of FIG. 1.

Preferably, as is common in this type of heat exchanger, the upper manifold 2 is employed as the intake manifold and receives the circulating heat transfer medium or coolant from the tubing connector 9 which is connected into the cooling system by appropriate tubing means. As stated above the manifold 2 is in fluid communication with the upper ends of the tubes 1. The lower manifold 3, therefore, becomes a discharge manifold and receives the coolant which has passed through the tubes 1 and been discharged from the tubes' lower ends. Thus the coolant which collects in the manifold 3 can be subsequently discharged from the tubing connector 10 back into the cooling system to which the connector 10 is connected in a closed fluid circuit.

If desired, Z-shaped mounting brackets 15 and 16 containing spaced bolt holes 15a, 16a respectively for the heat exchanger may be provided at the top and bottom of the heat exchanger and suitably attached as by welding to manifolds 2, 3 respectively. Also, if desired, spaced depressions 17, 17' may be formed in the upper walls 5 and 5' of manifolds 2 and 3 respectively beneath bolt holes 15a, 16a for accommodating mounting bolts (not shown) which may be used to attach the heat exchanger with the brackets 15, 16 to the associated supporting structure.

Referring now to FIG. 4, there is shown an enlarged view of one of the tubes 1 inserted through one of the tubulated openings 12 in the bottom tube sheet 4 of manifold 2 so as to project a short distance therethrough. As will be noted, the manifold tube sheet 4 is preferably formed with an upstanding marginal flange 18 which defines the opening 12 in the plate 4. This assembly represents the first step of joining the tube 1 into sealing engagement with the tube sheet 4. It should be understood that a sufficient number of spaced openings 12 should be provided in the tube sheet 4 to accommodate all of the upper ends of the tubes 1 used in the particular heat exchanger structure. Also, it should be understood that the same assembly as that shown in FIG. 4 would also be made at the bottom of the heat exchanger where the lower ends of the tube or tubes 1 would be inserted into the bottom plate 4' of the lower manifold 3.

It will be noted that the opening 12 is of such diameter as to snugly accommodate the end of the tube 1. However, the tube end may be press fitted into the opening 12 if a tighter fit is desired. As shown in FIG. 4, the upper end of tube 1 is inserted into the opening 12 only far enough to permit a short end portion 1a to project above the flange 18. When the tube 1 is located in the position of FIG. 4, resilient sealing means such as an annular O-ring 19, the inner diameter of which conforms substantially to the outer diameter of the tube 1, is threaded over the end of the tube 1 until it abuts the end of the marginal flange 18. This sealing gasket 19 may be of any desired type of resilient rubber-like plastic material such as "Buna-N" or "neoprene" synthetic rubber or the like. After the O-ring 19 is in the above described position, the upper end 1a of the tube 1 is expanded outwardly and then reentrantly back over the O-ring 19 by any suitable means such as a die to compress the O-ring into a tight sealing engagement with the tube sheet flange 18 as shown in FIG. 5.

Thus a simple and highly effective sealing engagement is obtained between the ends of the tubes 1 and the tube sheets 4, 4' of manifolds 2, 3 without the need of expensive and complicated metal fusing processes such as welding, brazing, etc. The O-rings 19 are held in compression by the end of tubes 1 and the liquid collected in manifolds 2, 3 flows only through the tubes. Thus, no intermixing results between the heat exchange fluids flowing along the inside and outside of the tubes 1 and the life of the seal is considerably extended with the elimination of the attendant corrosion generally occurring in a fused joint.

Referring now to the FIGS. 6 through 8, there is shown a modification of the invention. FIG. 6 discloses a heat exchanger similar to the heat exchanger of FIG. 1 consisting of a plurality of tubes 26 of substantially the same length arranged in spaced parallel relationship. A plurality of fins 27 are stacked in spaced parallel relationship and contain openings (not shown) through which the tubes 26 extend. The fins 27 are fixedly mounted to the tubes 26 by any suitable means such as expanding the tubes with a ball mandrel when the fins are in place.

An inlet connector tube 28 is provided at the top of the heat exchanger and is received within an opening 29 on the upper manifold 30. A mounting bracket 31 containing mounting holes 31a is suitably attached to the top of the manifold 30 similar to the arrangement of the heat exchanger of FIG. 1. It should be understood that a lower manifold (not shown) similar to the upper manifold 30 is provided at the bottom of the heat exchanger and contains a tubular outlet connector (not shown) similar to the intake connector 28.

Referring now to FIG. 7, the upper manifold 30 consists of a dished manifold forming member 33 provided with a peripheral flange 33a. The dished member 33 is preferably rectangular in shape as shown in FIG. 6 and is of sufficient depth to accommodate a substantial volume of fluid. The tube sheet 34 of manifold 30 is provided with at least one tubulated opening arranged to receive the upper end of a tube 26. This invention is particularly applicable to a heat exchanger containing a plurality of tubes 26 and therefor a sufficient number of spaced openings should be provided in the tube sheet 34 of the manifold 30 to accommodate all of the upper ends of the tubes 26. It will be noted also that the tubulated openings are preferably provided with an upstanding marginal flange 36.

In order to provide a gasket for a fluid-tight construction in the manifold 30, a unitary gasket strip 37, shown clearly in FIGURE 8, is molded from such resilient material as "Buna-N," "neoprene" rubber or the like. The gasket 37 contains a peripheral edge portion 38 and a plurality of integrally formed, spaced, O-rings 39, the number of which corresponds to the number of tubes 26 used in the heat exchanger assembly. It will be noted that these O-rings 39 are spaced similarly to the openings in the tube sheet 34 and are of sufficient inside diameter so as to be capable of being threaded over the flanges 36.

In the assembly of the heat exchanger of FIG. 6, the upper ends of the tubes 26 are inserted into the corresponding openings in the tube sheet 34 so as to project a short distance therethrough. It should be understood at this time that the same assembly technique is used on the lower manifold as the parts are correspondingly similar. The unitary gasket strip 37 is then placed in overlying relationship on the tube sheet 34 as shown in FIG. 7 with O-rings 39 threaded over the upper end of the tubes 26 and the flange 36. In the manner of FIG. 5, all of the projecting ends of the tubes 26 are then expanded outwardly and then reentrantly over the O-rings 39 by any suitable means such as a die to compress the O-rings into a tight sealing engagement with the tube sheet flanges 36 as shown in FIG. 7, tightly sealing the junction between the tube 26 and the tube sheet 34. It should be noted that the bending over of the tube ends may be done singly, but preferably the process may be simplified and reduced in cost by simultaneously bending over all of the tube ends with a single smack of a die. As the O-ring gasket providing member 37 is formed as an integral structure, it is a simple matter to thread the O-rings 39 over the ends of the tubes 26 and flanges 36.

As shown in FIG. 7, to assemble the manifold 30 the peripheral edge portion 38 of the unitary O-ring gasket 37 is aligned with and overlies the edge portion 34a of the tube sheet 34. The manifold dished member 33 is then positioned so that its flanged edge portion 33a sandwiches the gasket peripheral edge 38 between it and the tube sheet flange 34a to form a three ply flange. A pair of channel clamps 41, 42 which are of U-shape both in the direction of their length and cross-sectionally are slid over diametrically opposite halves of this triple-ply peripheral flange until their edges engage in abutting relationship 43.

In order to tightly position the U-clamps 41, 42 in the flange gripping arrangement of FIG. 6, the clamps may be indented or spot welded at spaced points 44 along the clamps to form an extremely tight and effective seal.

With the unitary O-ring gasket providing member 37 and the novel manifold construction assembly, the member 37 may be quickly and easily located in the desired position to permit the ends of tubes 26 to be bent over and compress its associated O-ring 39 into sealing engagement with the tube sheet 34. In addition, the unitary gasket member 37 contains an integral edge portion which permits the remainder of the manifold to be assembled on the tube sheet 34 in a fluid tight relationship without the need of any additional gasketing material or welded joints.

In order to improve the heat transfer efficiency of the heat exchangers of FIGS. 1, 6, the lateral edge portions of the fins 27 are preferably bent down as shown in FIG. 9 to form downwardly extending portions 27a, the lower edge of which contacts the adjacent fin. Thus, the air which moves in the direction of the double arrow D of FIG. 6 moves directly through the heat exchanger structure and there is no lateral flow of air. Thus, the heat transfer efficiency of the heat exchanger is improved with the resultant increase in the volume of air flowing over the tube and fin surfaces.

In the upper manifold 2, it will be noted that the reentrantly curved flare of the outer end of each tube 1 begins at a point adjacent the outer end of the adjacent annular flange 18 and extends annularly somewhat more than half way around the adjacent sealing ring 19 (see FIGS. 4–5). The outer reentrantly curved portion of this flare has tight annular compressive sealing engagement with the outer side of said sealing ring 19 so as to compress said sealing ring inwardly and thereby hold its inner side in tight annular sealing engagement with the outer side of said adjacent annular flange 18. The same thing holds true in the arrangement of FIG. 7 with respect to the reentrantly curved flare of the outer end portion of tube 26 and the annular flange 36 of the tube sheet 34.

Having described our invention, we claim:

1. A heat exchanger comprising: a tube sheet having inner and outer sides and a plurality of tube-receiving openings and being bent to provide around each opening an annular flange, which projects axially outward from the outer side of the tube sheet; a plurality of deformable annular sealing rings, one for each of a number of said axially-projecting annular flanges, each sealing ring being composed of a rubber-like plastic material and arranged to abut the outer end portion of its axially-projecting annular flange; and a plurality of tubes, one for each flanged tube-sheet opening, one outer end portion of each tube projecting outwardly from said outer side of said tube sheet, said projecting end portion being flared annularly outward and bent reentrantly back over the outer sides of both the adjacent sealing ring and the adjacent axially-projecting annular flange, said reentrantly curved flare beginning at a point adjacent the outer end of said axially-projecting annular flange and extending annularly at least half way around said sealing ring, the outer reentrantly curved portion of said flare having tight annular compressive sealing engagement with the outer side of said sealing ring so as to force said sealing ring inwardly and hold the inner side of that ring in tight annular sealing engagement with the outer side of said adjacent axially-projecting annular flange.

2. The exchanger of claim 1 wherein: each sealing ring is in the form of an O-ring.

3. The exchanger of claim 1 including: a sheet-like gasket extending over said outer side of said tube sheet and integrally containing said sealing rings.

4. The exchanger of claim 3 wherein: each sealing ring in said gasket is in the form of an O-ring having a thickness greater than that of the gasket material between O-rings.

5. The exchanger of claim 1 wherein: said reentrantly curved flare of each tube compresses the adjacent sealing ring against the end edge of the adjacent axially-projecting annular flange and the adjacent portion of the flare itself.

References Cited in the file of this patent

UNITED STATES PATENTS

| | | |
|---|---|---|
| 1,742,348 | Gamble | Jan. 7, 1930 |
| 1,760,505 | Lea | May 27, 1930 |
| 2,153,806 | Karmazin | Apr. 11, 1939 |
| 2,164,628 | Sibley | July 4, 1939 |
| 2,225,856 | Buck | Dec. 24, 1940 |
| 2,475,007 | Carlson | July 5, 1949 |
| 2,488,627 | Hisey | Nov. 22, 1949 |
| 2,705,616 | Watson | Apr. 5, 1955 |
| 2,759,248 | Burgess | Aug. 21, 1956 |

FOREIGN PATENTS

| | | |
|---|---|---|
| 315,934 | Great Britain | July 25, 1929 |
| 373,075 | Great Britain | May 19, 1932 |
| 489,896 | Great Britain | Aug. 5, 1938 |
| 859,745 | Germany | Dec. 15, 1952 |